US012692142B2

(12) United States Patent
Ramnarain et al.

(10) Patent No.: US 12,692,142 B2
(45) Date of Patent: Jul. 28, 2026

(54) COUNTER PRESSURE FILLER APPARATUS, SYSTEM, AND RELATED METHODS

(71) Applicant: PSR Automation, Inc., Shakopee, MN (US)

(72) Inventors: David R. Ramnarain, Shakopee, MN (US); Christopher D. Ramnarain, Shakopee, MN (US); Brian D. Ramnarain, Shakopee, MN (US)

(73) Assignee: PSR Automation, Inc., Shakopee, MN (US)

( * ) Notice: Subject to any disclaimer, the term of this patent is extended or adjusted under 35 U.S.C. 154(b) by 12 days.

(21) Appl. No.: 18/776,732

(22) Filed: Jul. 18, 2024

(65) Prior Publication Data

US 2026/0022003 A1 Jan. 22, 2026

(51) Int. Cl.
*B67C 3/10* (2006.01)
*B67C 3/26* (2006.01)

(52) U.S. Cl.
CPC .............. *B67C 3/10* (2013.01); *B67C 3/2614* (2013.01)

(58) Field of Classification Search
CPC .... B67C 3/06; B67C 3/10; B67C 3/26; B67C 3/2614; B67C 3/2617
See application file for complete search history.

(56) References Cited

U.S. PATENT DOCUMENTS

| | | | | | |
|---|---|---|---|---|---|
| 2,660,357 | A * | 11/1953 | Fechheimer | B67C 3/246 | 141/59 |
| 4,259,999 | A * | 4/1981 | Wada | B67C 3/10 | 141/237 |
| 4,860,802 | A * | 8/1989 | Yamaguchi | B65B 3/24 | 141/40 |
| 5,016,684 | A * | 5/1991 | Clusserath | B67C 3/06 | 141/39 |
| 6,189,578 | B1 * | 2/2001 | Clusserath | B67C 3/286 | 141/49 |
| 6,463,964 | B2 * | 10/2002 | Clusserath | B67C 3/065 | 141/63 |
| 7,287,562 | B2 * | 10/2007 | Tanikawa | B67C 3/2614 | 141/367 |
| 7,353,848 | B2 * | 4/2008 | Krulitsch | B67C 3/28 | 141/146 |
| 8,496,031 | B2 * | 7/2013 | Jenne | B67C 3/2614 | 141/285 |
| 8,505,594 | B2 * | 8/2013 | Krulitsch | B67C 3/244 | 141/90 |
| 8,631,839 | B2 * | 1/2014 | Meinzinger | B67C 3/20 | 141/105 |
| 11,498,823 | B2 * | 11/2022 | Hayakawa | B67C 3/001 | |

(Continued)

FOREIGN PATENT DOCUMENTS

| | | | | |
|---|---|---|---|---|
| JP | 2020075766 A * | 5/2020 | | B67C 3/08 |
| JP | 7316833 B2 * | 7/2023 | | B67C 3/08 |

*Primary Examiner* — Nicolas A Arnett
(74) *Attorney, Agent, or Firm* — DeWitt LLP

(57) ABSTRACT

Systems, methods, and apparatus are disclosed herein for counter pressure filling. In particular, embodiments of the present disclosure provide for independently operated filling nozzles for establishing counter pressure of containers when supplying carbonated liquid to provide consistent quality and improve product characteristics. The flow rate of the carbonated liquid can be manipulated based on the counter pressure maintained by the system during the filling cycle.

20 Claims, 10 Drawing Sheets

(56) References Cited

U.S. PATENT DOCUMENTS

| | | | | |
|---|---|---|---|---|
| 11,834,315 | B2 * | 12/2023 | Hayakawa | B67C 7/0073 |
| 2016/0021911 | A1 * | 1/2016 | Beuchert | A23G 9/282<br>141/105 |

* cited by examiner

COUNTER PRESSURE FILLER APPARATUS, SYSTEM, AND RELATED METHODS

TECHNICAL FIELD

The present disclosure relates generally to counter pressure fillers. More particularly, examples provided herein relate to an apparatus, system, and method for dynamically filling and carbonating liquids into containers.

BACKGROUND

Counter pressure filling operates based on the principle of equalizing the pressure inside a container with the pressure of a carbonated liquid to be dispensed. By matching these pressures, the release of dissolved gas is minimized, preserving the carbonation level of the carbonated liquid.

Counter pressure filling systems can be used to fill carbonated liquids, such as sparkling water, sparkling wine, kombucha, beer, or soda, into containers while maintaining carbonation and minimizing the loss of $CO_2$. Counter pressure fillers generally prepare, pressurize, fill, and/or seal bottles or cans with carbonated liquids.

Conventional counter pressure filler systems often have significant initial installation costs and/or are inefficient when maintaining $CO_2$ levels. Inefficient use of $CO_2$ can lead to higher operational costs and wastage. This inefficiency often stems from difficulties in achieving uniform pressure distribution, which can require precise control and monitoring. Many conventional carbonation systems may lack advanced monitoring and control capabilities. Further, frequent foaming when filling containers can necessitate regular cleaning and part replacement causing interruptions in production.

Variability in carbonation levels can affect the taste and texture of products. Therefore, there is a need for a more automated and consistent solution for filling carbonated beverages without excessive foaming or loss of carbonation. This is also a need in the industry for cost-effective and efficient systems, methods and apparatus for counter pressure filling of carbonated beverages.

SUMMARY

Systems, methods, and apparatus are disclosed herein for counter pressure filling. In particular, embodiments of the present disclosure provide for independently operated filling nozzles for establishing counter pressure of containers to provide consistent quality and improve product characteristics.

In a feature and embodiment, counter pressure inside a sealed container can be controlled and maintained.

In a feature and embodiment, a fill rate of a carbonated liquid can be controlled. For example, a (e.g., each) filling nozzle can be dynamically and independently controlled.

In a feature and embodiment, a sealed container can be filled to a prescribed volume. For example, a volume of gas inside a container can be accurately evacuated.

In a feature and embodiment, the release of dissolved concentration of $CO_2$ gas from the carbonated liquid can be prevented (e.g., during filling).

In a feature and embodiment, counter pressure can be introduced and maintained inside a container.

In a feature and embodiment, the presence of a solid stream of carbonated liquid exiting the container can be detected.

In a feature and embodiment, operational settings and parameters can be adjusted and recorded in a controller. In some implementations, the controller can automate refinements to the operation of the counter pressure filling system based on feedback data.

In some embodiments, a counter pressure filling system comprises a nozzle assembly including a nozzle bar supporting a first nozzle fluidly coupled to a carbonated liquid tank via a carbonated liquid line, a gas tank via a gas supply line, and a reservoir via a pressure relief line. The counter pressure filling system includes a controller communicatively coupled to the nozzle assembly and the conveying assembly. The controller has a memory and at least one processor configured to determine a container is in a filling position associated with the first nozzle, set the nozzle bar to a height at which the first nozzle is adjacent to an opening of a container (e.g., a blowout height), and purge the container with a supply of gas. Once the container is purged, the controller is configured to set the nozzle bar to a height at which the first nozzle forms a seal with the opening of the container (e.g., a dive height), establish counter pressure inside the container by maintaining the supply of gas, and fill the container with a supply of a carbonated liquid at a filling rate based on the counter pressure.

In one aspect, the nozzle bar supports a second nozzle fluidly coupled to the carbonated liquid tank via a second carbonated liquid line, the gas tank via a second gas supply line, and the reservoir via second pressure relief line. The controller can be configured to command the second nozzle independently from the first nozzle.

In one aspect, the counter pressure filling system comprises a conveying assembly including an indexer configured to align a container to the filling position associated with the nozzle. The conveying assembly can be communicatively coupled to the controller.

In one aspect, the counter pressure filling system comprises a pneumatic control system coupled to the nozzle assembly and the conveying assembly. The controller can be configured to control the height of the nozzle bar and operate the indexer using the pneumatic control system.

In one aspect, the controller is further configured to determine the container is filled with the carbonated liquid and, based on the determination, shutoff the supply of the carbonated liquid and the supply of the gas. The controller can (e.g., then) set the nozzle bar to the blowout height to break the seal with the opening of the container.

In one aspect, the determination that the container is filled with the carbonated liquid is based on a signal received from a liquid overflow sensor. The liquid overflow sensor can be configured to send the signal based on a configurable sensitivity threshold. For example, the configurable sensitivity threshold may be selected based on a property of the carbonated liquid (e.g., a propensity of the liquid to foam).

In one aspect, the determination that the container is in the filling position is based on a photoelectric sensor.

In one aspect, the controller can be further configured to display a graphical user interface (GUI). The GUI can receive user input including the blowout height and the dive height.

In some embodiments, a counter pressure filling method includes positioning a filling nozzle adjacent to an opening of a container, purging, via the filling nozzle, the container with a gas, positioning the filling nozzle against the opening of the container to form a seal, establishing, via the filling nozzle, counter pressure inside the container by maintaining supply of the gas to the container, and filling, via the filling nozzle, the container with a carbonated liquid at a filling rate based on the counter pressure.

In one aspect, the counter pressure filling method includes determining the container is filled with the carbonated liquid, closing, via the filling nozzle and based on the determination the container is filled, the supply of the carbonated liquid and the supply of the gas, and positioning the filling nozzle about the opening of the container such that the seal is broken.

In one aspect, determining whether the container is filled with the carbonated liquid is based on a signal received from a liquid overflow sensor. The liquid overflow sensor can be configured to send the signal based on a configurable sensitivity threshold. For example, the configurable sensitivity threshold can be selected based on a property of the carbonated liquid.

In one aspect, the counter pressure inside the container is selected to be less than an infeed liquid pressure of the carbonated liquid. The fill rate of the carbonated liquid in the container can be based on the counter pressure inside the container.

In some embodiments, a counter pressure nozzle comprises a carbonated liquid infeed port configured to supply a carbonated liquid based on a pneumatically controlled valve, a gas infeed port configured to supply a gas, a pressure relief port configured to receive overflow of the gas and the carbonated liquid, a counter pressure assembly configured to receive and establish a seal with an opening of a container, and a pump fluidly coupled to the pressure relief port, wherein the pump is configured to maintain counter pressure inside the container.

In one aspect, the counter pressure assembly includes a centering guide having an inwardly tapered edge configured to align the opening of the container with the counter pressure assembly.

In one aspect, the counter pressure nozzle includes a pressure sensor configured to monitor pressure inside the container.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof can be more completely understood in consideration of the following detailed description of various embodiments in connection with the accompanying figures.

Figure 1:
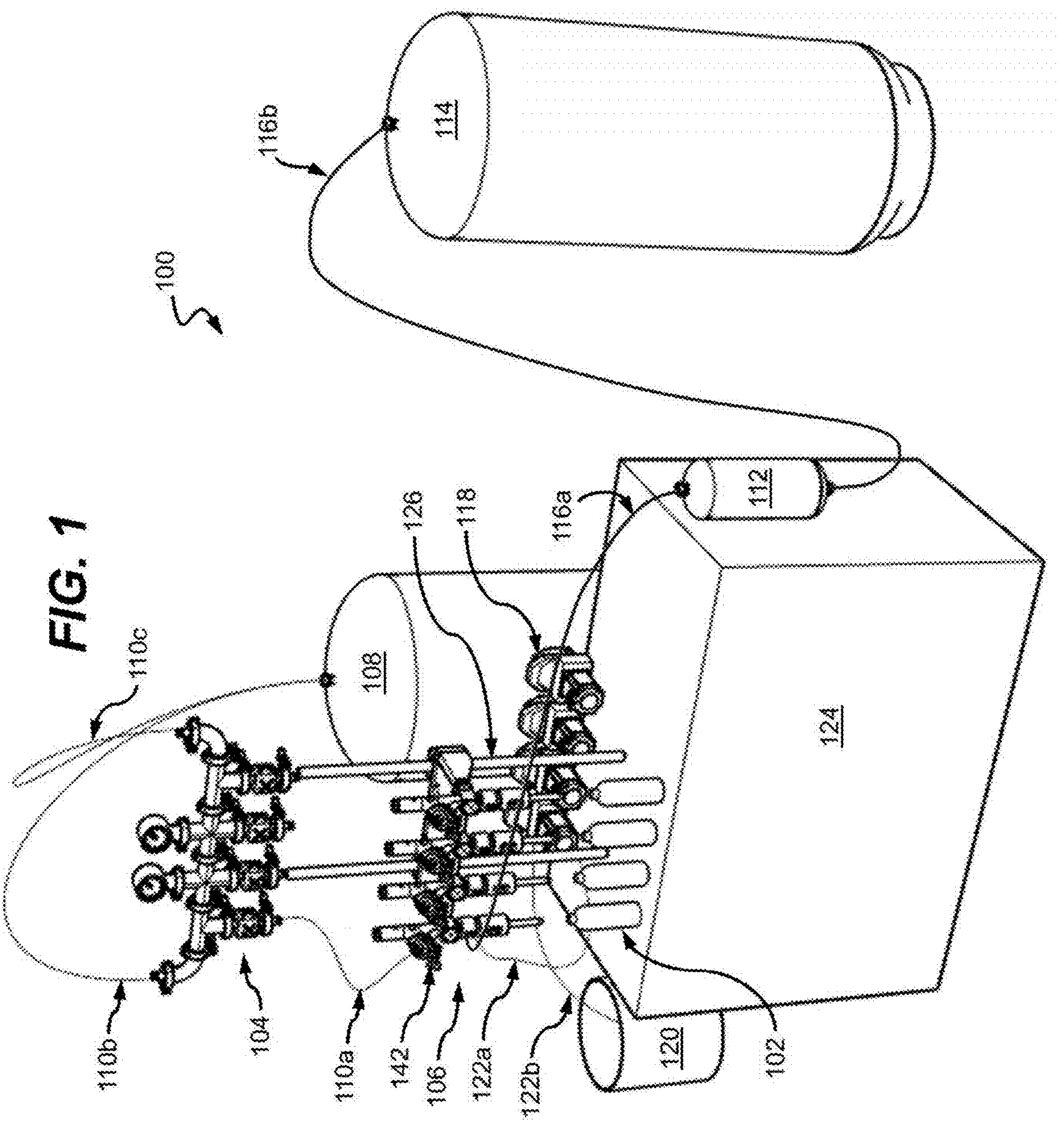
FIG. 1 depicts a perspective view of a counter pressure filler system, according to certain aspects of the present disclosure.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

The present disclosure provides examples for maintaining counter pressure when filling a container with carbonated liquids, such as soda, sparkling water, kombucha, juices, sparkling wine, beer, and the like. Examples enable a variety of containers to be individually filled with carbonated liquids in such a way as to reduce risks of loss of carbonation and/or over pressurization.

Carbonated liquids are liquids containing dissolved gas. An appropriate gas or gas mixture may be selected based on the respective filling product. In the case of carbonated beverages, the gas is often $CO_2$. Accordingly, embodiments of the present disclosure generally refer to $CO_2$, but it should be appreciated that other gas or gas mixtures may be substituted as appropriate (e.g., based on the desired product). Described embodiments allow for precise control of counter pressure such that the systems and methods are able to account for variances in pressure of carbonated liquids and/or added gases.

The infusion process involves dissolving $CO_2$ gas by using a specialized pressurized vessel. The liquid is contained in the vessel then pressurized (e.g., to 17-25 PSI) with $CO_2$ gas. The exact pressure (e.g., PSI) can depend on the concentration of the $CO_2$ gas that the formula requires. If the carbonated liquid is agitated (e.g., due to movement) the loss of carbonation can be expedited. For example, stirring a carbonated liquid can increase the rate of evaporation of the $CO_2$ gas into the atmosphere (e.g., which may remove some of the liquid). Temperature, pressure, and time are factors that can affect the concentration of dissolved $CO_2$ gas in the liquid. When a carbonated liquid loses sufficient carbonation, the carbonated liquid may be referred to as being flat.

Temperature can influence the concentration of dissolved $CO_2$ gas in a liquid. A cold temperature (e.g., of the liquid and/or ambient temperature) can allow the $CO_2$ gas to be more easily dissolved and/or infused into the beverage or liquid (e.g., compared to room temperature). For example, $CO_2$ gas can stay dissolved in a liquid if the temperature of the liquid remains below 32 degrees Fahrenheit. If the temperature increases above 32 degrees Fahrenheit, the $CO_2$ gas that is dissolved in the liquid can start to evaporate (e.g., return to a natural gaseous state).

Pressure can influence the concentration of dissolved $CO_2$ gas in a liquid. Sealing the container, such as by capping the container, soon after the filling process can maintain the pressure of the container, allowing for prolonged carbonation.

Counter pressure fillers generally purge the container with $CO_2$ to displace any residual gases, particularly oxygen, which could compromise beverage quality (e.g., by reducing carbonation levels). The container can (e.g., then) be pressurized with $CO_2$ to create a controlled environment conducive to filling. The container pressure can match the pressure of the carbonated beverage to prevent undesired $CO_2$ release. With the bottle pressurized, the carbonated beverage can be introduced into the bottle while maintaining the equilibrium pressure. If properly controlled, the counter pressure filling process can more efficiently use carbonated liquids by reducing foaming (e.g., optimizing product yield).

Embodiments of the present disclosure offer several advantages over conventional counter pressure filling systems, particularly for small-scale automation. Embodiments of the present disclosure allow for reduced system complexity, increased preservation of carbonation levels, reduction of foaming, finer control (e.g., on a per container basis), and improved consistency.

Referring to FIG. 1, a perspective view of a system 100 for filling containers 102 with carbonated liquid is depicted, according to an embodiment. System 100 is structured and configured to generate counter pressure when filling containers 102 with carbonated liquid such as soda, sparkling water, beer, wine and the like. Containers 102 can be any container suitable for storing carbonated liquids, such as bottles or cans. Containers can be made of, for example, one or more of glass, rigid plastic, or metal (e.g., aluminum cans).

System 100 generally includes a carbonated liquid assembly 104, a counter pressure assembly 106, a carbonated liquid vessel 108, carbonated liquid tubing 110, a $CO_2$ surge tank 112, a $CO_2$ tank 114, $CO_2$ tubing 116, a pressure relief assembly 118, a reservoir 120, pressure relief tubing 122, a station 124, and a support frame 126.

As illustrated in FIG. 1, carbonated liquid tubing 110 connects carbonated liquid assembly 104, counter pressure assembly 106, and carbonated liquid vessel 108. A first portion of carbonated liquid tubing **110*a* connects carbonated liquid assembly 104 to counter pressure assembly 106. A second portion of carbonated liquid tubing 110*b*, 110*c* connects carbonated liquid assembly 104 to carbonated liquid vessel 108. In some embodiments, carbonated liquid vessel 108 can be connected to carbonated liquid assembly 104 through multiple lines of carbonated liquid tubing 110*b*, 110*c*. For example, carbonated liquid assembly 104 can be coupled to multiple sources of carbonated liquid. In such examples, carbonated liquid assembly 104 can process different carbonated liquids simultaneously. Transfer of the carbonated liquid from vessel 108 to carbonated liquid assembly and/or counter pressure assembly 106 can be done under pressure (e.g., 17-24 PSI). In some embodiments, vessel 108** can be pressurized with $CO_2$, forcing the carbonated liquid to flow when a distribution manifold valve is open.

$CO_2$ tubing 116 connects counter pressure assembly 106, $CO_2$ surge tank 112, and $CO_2$ tank 114. In some embodiments, $CO_2$ surge tank 112 is configured along a (e.g., each) line of $CO_2$ tubing 116 such that a first portion of $CO_2$ tubing **116*a* connects $CO_2$ counter pressure assembly 106 to $CO_2$ surge tank 112 and a second portion of $CO_2$ tubing 116*b* connects $CO_2$ surge tank 112 to $CO_2$ tank 114. In some embodiments, $CO_2$ surge tank 112** is optional.

Pressure relief tubing 122 connects counter pressure assembly 106, pressure relief assembly 118, and reservoir 120. In some embodiments, pressure relief assembly 118 is configured along a (e.g., each) line of pressure relief tubing 122 such that a first portion of pressure relief tubing **122*a* connects counter pressure assembly 106 to pressure relief assembly 118 and a second portion of pressure relief tubing 122*b* connects pressure relief assembly 118 to reservoir 120**.

Counter pressure assembly 106 can include filling nozzle (s) 142. In some embodiments, a (e.g., each) filling nozzle 142 is directly connected to relevant elements of system 100 via independent tubing (e.g., as illustrated in FIG. 1). For example, a (e.g., each) filling nozzle 142 can be directly connected to carbonated liquid assembly 104, $CO_2$ surge tank 112, and pressure relief assembly 118 via unique lines of carbonated liquid tubing **110*a*, $CO_2$ tubing 116*a*, and/or pressure relief tubing 122*a*** respectively.

In some embodiments, the number, type, and/or properties of tubing incorporated into system 100 (e.g., carbonated liquid tubing 110, $CO_2$ tubing 116, and pressure relieve tubing 122) is selected based on, for example, one or more of: compatibility with liquid or gas, pressure rating, temperature rating, flexibility, durability, sanitation (e.g., case of cleaning), regulatory compliance, or production scale. System 100 can incorporate tubing with properties such as food-grade tubing (e.g., certified for use with consumable products), chemical-resistant tubing, or heat-resistant tubing, for example based on the type of carbonated liquid. For example, liquids with different viscosities, such as beer and soda, can influence the choice of tubing material and diameter. For example, acidic beverages may require tubing resistant to corrosion and chemical reactions. In some implementations, carbonated liquid tubing 110, $CO_2$ tubing 116, and pressure relieve tubing 122 may comprise different materials, length, and/or diameter.

In some embodiments, the number, type, and/or properties of tank(s), vessel(s), and reservoir(s) incorporated into system 100 (e.g., carbonated liquid vessel 108, $CO_2$ surge tank 112, $CO_2$ tank 114, and reservoir 120) are selected based on, for example, one or more of: liquid type, carbonation level, pressure rating, durability, sanitation (e.g., case of cleaning), regulatory compliance, or production scale. Selecting the appropriate storage container type(s) and quantities may depend on production needs and quality and cost considerations.

In some embodiments, sensor(s) are present along carbonated liquid tubing 110, $CO_2$ tubing 116, and/or pressure relief tubing 122 to facilitate real-time monitoring and control of system 100. Sensors can include, for example, pressure sensors, flow sensors, and/or temperature sensors. For example, pressure sensors can be used to activate pressure relief system 118 at a pressure threshold to prevent over-pressurization. Over-pressurization can lead to equipment failure or safety risks, such as container 102 shattering. By incorporating sensors into the carbonated liquid tubing 110, $CO_2$ tubing 116, and pressure relief tubing 122, system 100 can achieve greater precision, efficiency, and safety in handling carbonated beverages.

One or more elements of system 100 may be removably coupled with or organized (e.g., positioned, oriented) relative to station 124. Station 124 can include support frame 126 to support carbonated liquid assembly 104 and/or counter pressure assembly 106.

In some embodiments, station 124 includes a feeding system (not shown) for containers 102. The feeding system can infeed empty containers 102 into a filling position. System 100 is configured to determine when empty containers 102 are in the filling position. For example, system 100 can have sensor(s) (e.g., photo-electric sensors) to detect when empty containers 102 are in a filling position (e.g., relative to counter pressure filler assembly 106). For example, system 100 can include indexer(s) configured to move containers 102 along station 124. System 100 can perform a filling cycle based on the determination that empty containers 102 are in the filling position. The feeding system can (e.g., then) outfeed filled containers 102. System 100 may then infeed additional empty containers 102 and repeat the filling process.

Figure 2:
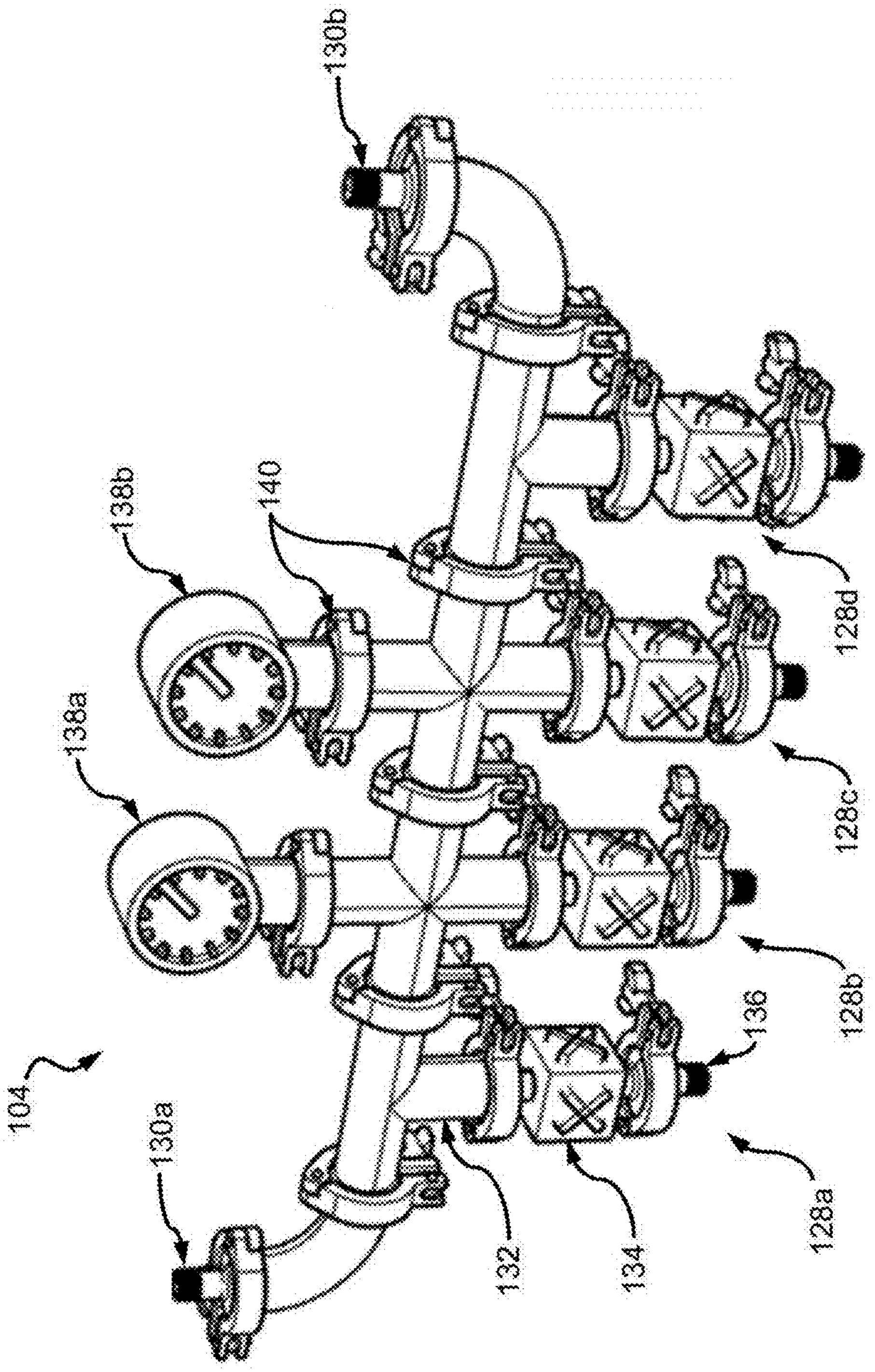
FIG. 2 depicts a perspective view of a carbonated liquid assembly, according to certain aspects of the present disclosure.

Referring to FIG. 2, a close-up, perspective view of a carbonated liquid assembly 104 is depicted, according to an embodiment. Carbonated liquid assembly is structured and configured to control the supply of carbonated liquid from carbonated liquid vessel 108 to counter pressure assembly 106. Carbonated liquid assembly 104 comprises valve assemblies 128, liquid inlets 130, and body 132.

A (e.g., each) valve assembly 128 generally comprises a valve 134 and a liquid outlet 136. In some embodiments, valve 134 is a one-way valve to prevent the back flow of liquid into carbonated liquid vessel 108 (e.g., containing the product supply). In some embodiments, a (e.g., each) valve assembly 128 includes a manual shutoff knob (not shown).

In some embodiments, carbonated liquid assembly 104 can include multiple valve assemblies 128*a*, 128*b*, 128*c*, 128*d*. The number of valve assemblies 128 can be based on, for example the number of filling nozzles 142.

In some embodiments, carbonated liquid assembly 104 can include one or more liquid inlets 130*a*, 130*b* structured to receive carbonated liquid from vessel 108 via carbonated liquid tubing 110*b* (as shown in FIG. 1). The number of liquid inlets 130 can be based on, for example the number carbonated liquid lines and/or the carbonated liquid storage arrangement. For example, a (e.g., each) liquid inlet 130 can be removably coupled to an independent carbonated liquid source via carbonated liquid tubing 110. In some implementations, different carbonated liquids (e.g., which may have different liquid properties, such as propensity to foam) can be filled simultaneously using system 100.

In some embodiments, the pressure of carbonated liquid (e.g., at valve assemblies 128) is monitored by pressure sensors 138. A pressure sensor 138 can monitor a particular carbonated liquid supply. For example, in configurations of carbonated liquid assembly 104 with multiple liquid inlets 130*a*, 130*b*, pressure sensors 138*a*, 138*b* can each measure the pressure of a corresponding liquid inlet.

Fittings 140 can be incorporated within carbonated liquid assembly 104 and system 100 more broadly as necessary (e.g., based on tubing, sensor, or valve arrangements). For example, fittings 140 can be used to connect different parts of body 132 or a pneumatic system, to prevent leaks during operation. In some embodiments, fittings 140 are sanitary fittings.

Figure 3:
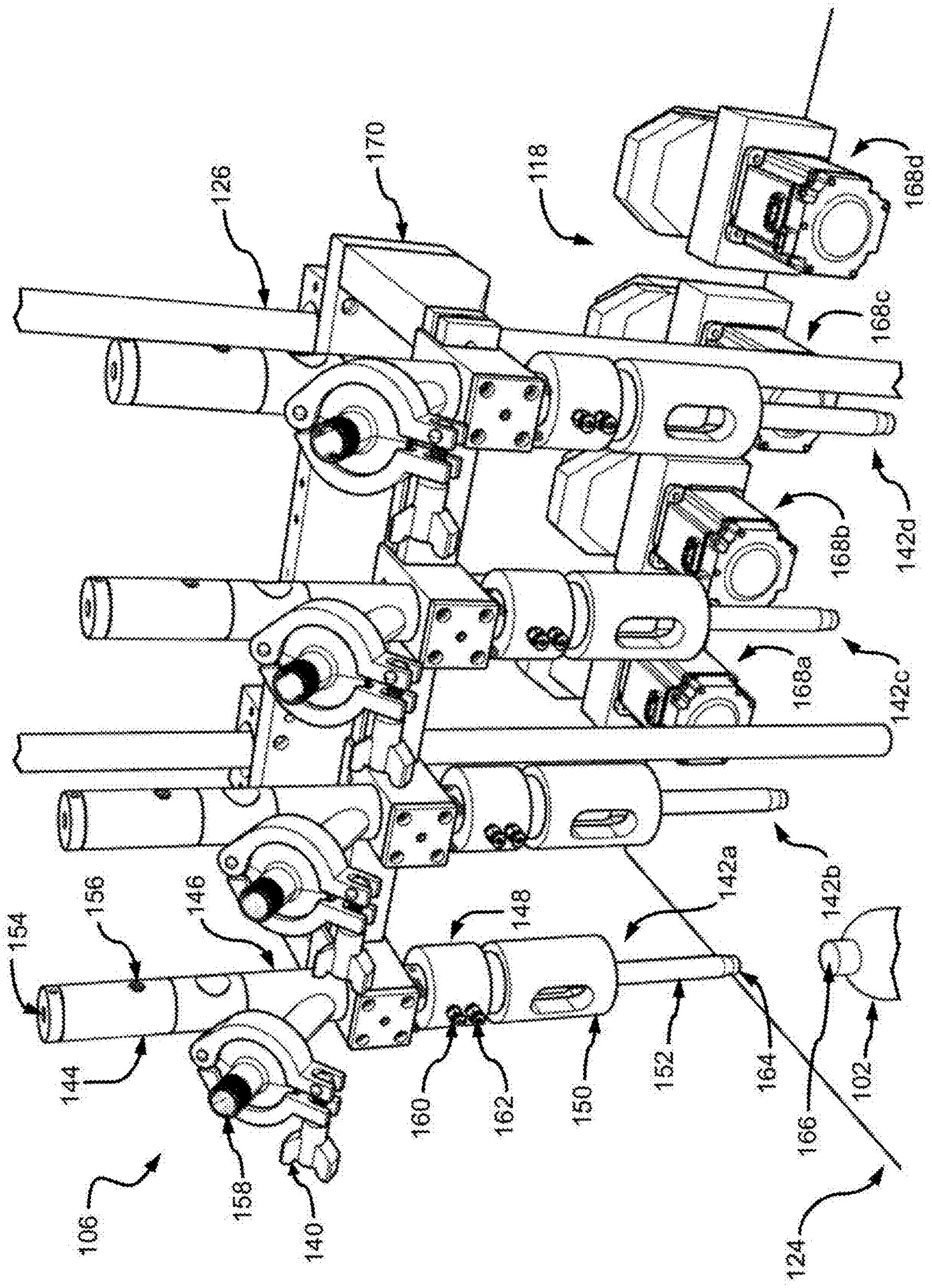
FIG. 3 depicts a perspective view of a counter pressure assembly, according to certain aspects of the present disclosure.

Referring to FIG. 3, a close-up, perspective view of counter pressure assembly 106 and pressure relief assembly 118 is depicted, according to an embodiment.

Counter pressure assembly 106 is structured and configured to control the supply of carbonated liquid and $CO_2$ gas when filling container 102. Counter pressure assembly generally comprises a filling nozzle 142. In some embodiments, a number of filling nozzles 142 depends on a desired production scale. For example, the number of filling nozzles 142*a*, 142*b*, 142*c*, 142*d* can correspond to the number of valve assemblies 128*a*, 128*b*, 128*c*, 128*d*.

A (e.g., each) filling nozzle 142 comprises a pneumatic cylinder 144, a liquid infeed compartment 146, counter pressure compartment 148, a centering cup 150 and a nozzle 152. Pneumatic cylinder 144 can be a pneumatic actuator structured and configured to control the flow of carbonated liquid within filling nozzle 142, for example, using a first inlet air nozzle 154 and a second inlet air nozzle 156. In some embodiments, pneumatic cylinder 144 can be used to control the opening and closing of a valve.

Liquid infeed compartment 146 defines an internal liquid feed cavity accessible via a liquid inlet 158. Liquid inlet 158 is configured to selectively couple carbonated liquid tubing 110*a*.

In some embodiments, pneumatic cylinder 144 is configured to convert compressed air into linear motion of a plunger within liquid infeed compartment 146 (e.g., to control the flow of carbonated liquid within filling nozzle 142). For example, supply of air to first air inlet nozzle 154 can prevent carbonated liquid from entering nozzle 152 (e.g., by lowering the internal plunger). For example, supply of air to second air inlet nozzle 156 can allow carbonated liquid to flow to nozzle 152 (e.g., by raising an internal plunger).

Counter pressure compartment 148 includes a gas inlet 160 and a return outlet 162. Gas inlet 160 is configured to receive $CO_2$ from $CO_2$ surge tank 112 or $CO_2$ tank 114 via $CO_2$ tubing 116. Return outlet 162 is configured to act as a selectively coupled pressure relief tubing 122*a*.

Centering cup 150 is configured to align a dispensing end 164 of nozzle 152 with opening 166 of containers 102. For example, in some embodiments, nozzle 152 is retractable relative to centering cup 150 such that centering cup 150 can receive the top of container 102 prior to insertion of nozzle 152 to opening 166 (e.g., by lowering nozzle 152). Dispensing end 164 of nozzle 152 can be tapered, for example, to (e.g., further) facilitate alignment with opening 166. Centering cup 150 can be removably coupled to filling nozzle 142 (e.g., via threading, fasteners). In some embodiments, centering cup 150 may be unnecessary (e.g., removed), for example if container 102 has a broad opening relative to the diameter of nozzle 152.

Filling nozzle 142 is structured and configured to allow the carbonated liquid to flow into the container during a filling cycle. For example, filling nozzle 142 can turn on or off the flow of carbonated liquid.

Pressure relief assembly 118 is structured and configured to control the counter pressure of container 102 and manage any overflow during the filling process. Pressure relief assembly 118 can include one or more pumps 168. In some embodiments, the number of pumps 168*a*, 168*b*, 168*c*, 168*d* can correspond to the number of filling nozzles 142*a*, 142*b*, 142*c*, 142*d*. For example, a (e.g., each) pump can be connected to a corresponding filling nozzle 142 via pressure relief tubing 122. In some embodiments, pressure relief tubing 122 can act as a fluid return line. Pumps 168 can adjust the fill speed of a connected filling nozzle 142, for example to reduce foaming of a carbonated liquid.

In some embodiments, pumps 168 are peristaltic pumps that operate by squeezing flexible tubing (e.g., pressure relief tubing 122). Incorporation of a peristaltic pump allows for pumping a wide range of fluids, including viscous, corrosive, and particulate-laden liquids, without degassing. Peristaltic pumps can run dry without damage, which is beneficial in filling situations where the supply of fluid is intermittent. In some embodiments, use of a peristaltic pump prevents cross-contamination as the carbonated liquid is the only fluid contacting the interior of the tubing, reducing the risk of contamination and simplifying cleaning or replacement.

In some embodiments, a (e.g., each) pump 168 includes a motor to control flow rate. For example, a (e.g., each) pump 168 can include one or more of: a servo motor, an AC motor, a DC motor, a variable frequency drive motor, or a stepper motor. In some embodiments, a (e.g., each) pump 168 includes a servo motor to provide high torque and precise dosing and flow control. Use of a motorized pump 168 for each filling nozzle 142 allows for the speed of the pump to be adjusted independently of other filling nozzles.

In some embodiments, pressure relief assembly 118 can include a valve (e.g., rather than pumps 168). For example, pressure relief assembly 118 can include a valve selectively coupled to a (e.g., each) filling nozzle 142. In some implementations, a needle valve, a spring-loaded relief valve (e.g., incorporating a spring mechanism to open the valve at a preset pressure), or a pilot-operated relief valve (e.g., use of an auxiliary pressure to control the opening) can be incorporated into pressure relief mechanism 118. For example, a needle valve can be used to precisely control the flow rate of a carbonated liquid. A needle valve can include a slender, tapered point at the end of a valve stem that moves into and out of a matching tapered seat to control flow.

A stationary valve in pressure relief system 118 can lead to foaming issues when handling carbonated liquids. For example, if the stationary valve is opened or closed too quickly, it can cause a sudden drop in pressure. This rapid pressure change can cause dissolved $CO_2$ to cause unwanted foaming. Further, pressure build-up can occur upstream, causing the carbonated liquid to foam when it is eventually released.

In some embodiments, incorporating valves within pressure relief system 118 may lead to an obstruction within pressure relief tubing 122. For example, if a carbonated liquid is sticky, the fluid return line can become clogged at the valve.

In some embodiments, pressure relief assembly 118 including pumps 168 can provide advantages over conventional counter pressure filling systems. Pumps 168 with variable speed drives offer precise control over system pressure, allowing for fine adjustments to maintain optimal pressure levels within container 102. The ability to adjust pump speed in real-time allows system 100 to respond quickly to changes in demand or pressure conditions. By actively managing pressure, the likelihood of reaching a point where a mechanical pressure relief device needs to activate is reduced.

In some embodiments, a (e.g., each) line of pressure relief tubing 122 can include a sensor. A pressure sensor incorporated along pressure relief tubing 122 (e.g., a product return line) allows for pressure inside a (e.g., each) container 102 to be measured. For example, the pressure sensor can measure pressure within container 102 to determine whether a seal is made between filling nozzle 142 and container 102. For example, the pressure sensor can determine if carbonated liquid is present in pressure relief tubing 122.

In some embodiments, counter pressure assembly 106 and/or pressure relief assembly 118 are coupled to station 124. In some embodiments, counter pressure assembly 106 includes a nozzle bar 170 that is configured to move along support frame 126.

In some embodiments, the position of nozzle bar 170 on support frame 126 can be controlled via a motor, such as a servo motor. The position of nozzle bar 170 can be determined (e.g., by system 100) using sensors. For example, a maximum height of nozzle bar relative to station 124 can be determined based on a measure of load (e.g., torque) applied to nozzle bar 170.

In some embodiments, the position of nozzle bar 170 on support frame 126 can be controlled pneumatically. Pneumatic control of a position of counter pressure assembly 106 and pneumatic cylinder 144 can be based on a common air source (not shown).

In operation, system 100 can generate counter pressure when filling containers 102 with carbonated liquid such as soda, sparling water, beer, and the like. Container 102 is placed under a corresponding filling nozzle 142 such that the top of the container 102 can be sealed off using gasket (e.g., a rubber seal) of filling nozzle 142.

For purposes of FIGS. 1-3, it can be assumed containers 102 are already present/loaded relative to system 100. For example, containers can be loaded into a filling position corresponding with each filling nozzle via a motorized conveyor and/or timing screw. After a (e.g., each) filling cycle, the filled container can be replaced by an empty container such that the filling process can be repeated.

In some embodiments, a pneumatic control system can be used in managing the handling and filling of containers. For example, indexers associated with a conveyor system can be pneumatically controlled to determine when containers 102 are in filling positions. Such indexers can be operated with, for example, 15 PSI. The same compressed air supply can be used to precisely control pneumatic cylinder 144 to precisely control the flow of liquid within filling nozzle 142. Independent control of each filling nozzle 142 can facilitate consistent filling across containers, maintaining uniformity in the final product.

Pneumatic pressure can be managed by regulators. For example, compressed air can be stored at a relatively high pressure (e.g., 90 PSI). A first regulator can be configured to provide air at a medium pressure (e.g., 60 PSI) for operating filling nozzles and a second regulator can be configured to provide compressed air at a low pressure (e.g., 15 PSI) for operating indexers to move containers 102. The pneumatic system of system 100 can provide instant responses to control signals, for example, based on data captured by pressure sensors.

Operating parameters of system 100 can be calibrated based on specifications of containers 102 and properties of the carbonated liquid to be used. For example, a set of operating parameters can be selected based on the height of containers 102. In some embodiments, one or more of the following operating parameters can be calibrated: safe height, dive height, blowout height, purge time, sensor time on, lower post fill time, upper post fill time, blow out time, and the like.

Height-based operating parameters (e.g., safe height, dive height, blowout height) can be based on the position of nozzle bar 170 and/or filling nozzles 142. For example, in some embodiments filling nozzles 142 can be set to a fixed position (e.g., unable to move) relative to nozzle bar 170. In such examples, a position (e.g., height) of nozzle bar 170 can be indicative of a position (e.g., height) of filling nozzles.

Safe height can refer to a standard height of nozzle bar 170 when system 100 is not in a filling cycle. For example, nozzle bar 170 can be set to a safe height that is 3 inches above the height of a container 102. The ability to set a safe height, rather than simply using a maximum height of nozzle bar 170, allows for less downtime between filling cycles and greater efficiency (e.g., as the range of motion of nozzle bar 170 is comparatively reduced).

Dive height can refer to a height of nozzle bar 170 when lowered to form a seal with containers 102 (e.g., during a filling cycle). For example, nozzle bar can be set to a dive height of 10 inches for a container 10 inches tall. A seal between a filling nozzle 142 and container 102 can be determined based on load experienced by nozzle bar 170 (e.g., as measured by a force sensor associated with nozzle bar 170) or the ability of system 100 to maintain pressure within container 102 (e.g., as measured by a pressure sensor). For example, a pressure sensor (e.g., a liquid overflow sensor) along pressure relief tubing 122 can be used to determine whether counter pressure can be established. In such examples, the dive height can be the height at which a pressure equilibrium can be established.

Blowout height can refer to a height of nozzle bar 170 where the seal between container 102 and filling nozzle 142 can be broken (e.g., to depressurize the container after filling). For example, if the dive height is set to 10 inches the blowout height may be set to 10.25 inches to allow system 100 to relieve the pressure from container 102.

Timers, such as purge time, sensor time on, lower post fill time, and upper post fill time, can be set to balance efficiency and production rate.

Purge time refers to the amount of time after filling nozzle 150 dives into container 102 that system 100 will purge the container with $CO_2$. For example, purge time can be adjusted based on the size (e.g., internal volume) of container 102.

Sensor time on refers to the delay after a filling cycle before a pressure sensor (e.g., a liquid overflow sensor) along pressure relief tubing 122 is actively monitored/considered. In some cases, leftover liquid from a prior filling cycle can remain in pressure relief tubing 122, which could lead to a false positive of overflow on the next filling cycle. Sensor time on allows for system 100 to reset (e.g., remove any leftover liquid in pressure relief tubing 122) before monitoring or acting on associated pressure readings.

Lower post fill time refers to time after the bottle has been filled that nozzle bar 170 or filling nozzle 142 remain in a lowered position (e.g., the dive height). Upper post fill time refers to the time nozzle bar 170 or filling nozzle 142 remain at a raised position (e.g., the safe height) before the filling cycle is considered done. Blow out time refers to the time nozzle bar 170 or filling nozzle 142 remain at a height associated with depressurization (e.g., the blow out height) before returning to a raised position (e.g., the safe height).

The calibration process can be automatic or manual. In some embodiments, sensors and key metrics can be used (e.g., by system 100) to automatically determine optimal operating parameters for a particular container and carbonated liquid. For example, a safe height can be determined based on load experienced by nozzle bar 170. When the load surpasses a threshold, and for example the nozzle bar 170 is not at a max height, a safe height can be identified. In some embodiments, the height of nozzle bar 170 and/or a (e.g., each) filling nozzle 142 can be manually adjusted using buttons on a graphical user interface (GUI) associated with system 100. Operating parameters, such as operating phase heights, can be determined based on manual observation and user input (e.g., via the GUI).

Calibration can facilitate adjustment of pressure, flow rate, and fill level based on a container type and/or a carbonated liquid. For example, the flow rates can be fine-tuned per carbonated liquid to ensure each container is filled accurately without causing foaming or overflow.

In some embodiments, a set of operating parameters can be saved to memory. A set of operating parameters can include nozzle heights, pressure settings, flow rates, fill levels, and any other relevant metrics. Operators can, for example, quickly select the desired container type from the control system's interface, loading the saved parameters. Once the parameters are selected, the system can automatically adjust to the pre-set conditions, ensuring consistent and efficient operation. System 100 allows operators to add new containers and customize parameters as needed, ensuring flexibility.

Many different types of containers, such as cans and bottles, exist. System 100 can be calibrated for a (e.g., each) type of container. For example, an end user can make bottle and carbonated liquid specific adjustments (e.g., so the machine functions optimally). These adjustments can be associated with accommodating particular dimensions or properties (e.g., resistances) of the desired container (e.g., a bottle).

Embodiments of the present disclosure allow for uniform quality, reduced variability (e.g., human error), faster changeovers, flexibility between containers and carbonated liquids, and scalability. For example, automated control of operating parameters ensures consistent fill levels, pressure, and carbonation across all containers, maintaining product quality and reducing overfill (e.g., product loss).

Some counter pressure filling systems are controlled on a per station basis, for example, where a station refers to one or more filing units (e.g., nozzles) that are commonly controlled, for example by being associated with (e.g., sharing) a valve, a motor, and/or transportation system. Such counter pressure filling systems can require the incorporation of carbonated liquid and $CO_2$ supplies that are commonly fed to all containers in the station (e.g., rather than individual filling nozzles).

Station-based packaging systems, for example that comprise commonly controlled filling units, can encounter inconsistent filling across nozzles and/or be unable to precisely control foam levels. This lack of precision in operation and monitoring capabilities can lead to waste of product, interruptions in assembly operation (e.g., due to spillage), and/or damage to the container(s). For example, filling all containers from a common feed or at a common pressure can result in overfilling or underfilling particular containers at a station. This variation in fill level can be unsuitable for sale. Further, station-based packaging systems can be unable to communicate high granularity data, such as detailed metrics on foaming, to a control system.

Embodiments of the present disclosure allow for individual control of filling nozzles. Individual operation of filling nozzles and the ability to scale a number of filling nozzles as needed allows for simplified expansion or contraction of production amounts. For example, a (e.g., each) filling nozzle can be opened or closed independently. For example, a (e.g., each) relief pump can be opened or closed independently.

Figure 4A:
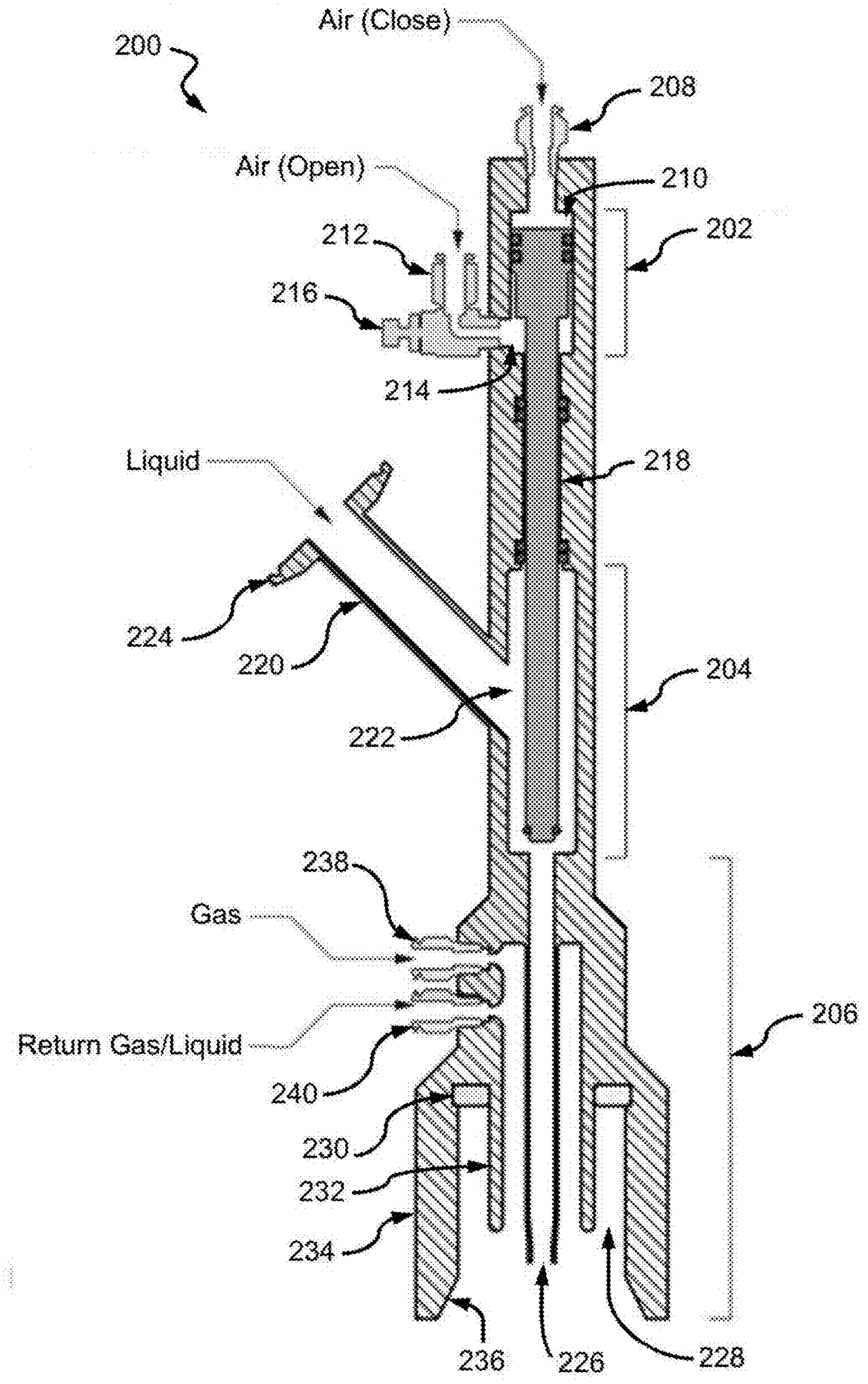
FIG. 4A depicts a transected view of a filling nozzle in an open orientation, according to certain aspects of the present disclosure.
Figure 4B:
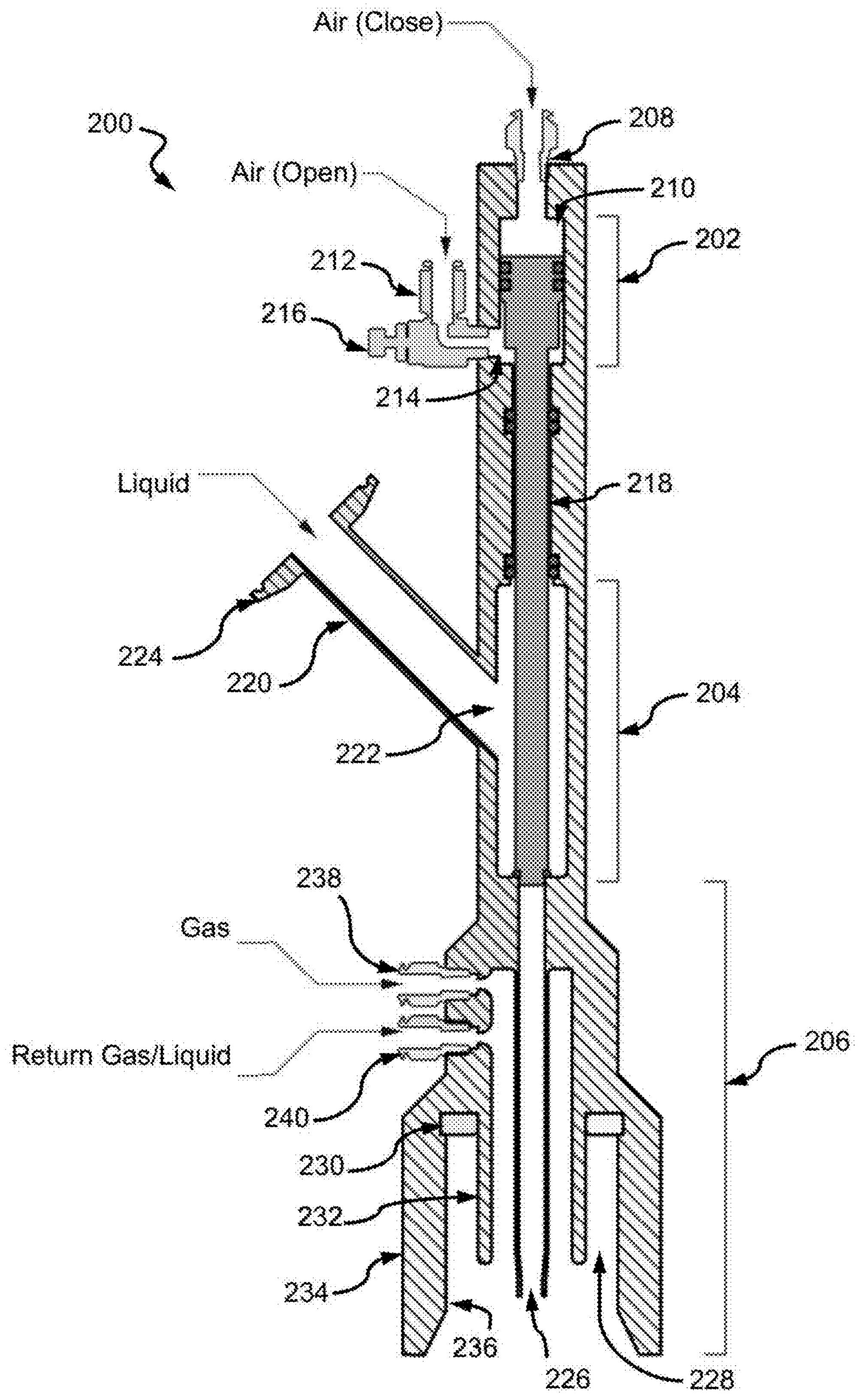
FIG. 4B depicts a transected view of the filling nozzle of FIG. 4A in a closed orientation.

FIG. 4A is a transactional view of filling nozzle 200 in an open orientation, according to an embodiment. FIG. 4B is a transactional view of filling nozzle 200 in closed orientation, according to an embodiment. Filling nozzle 200 is structured and configured to facilitate counter pressure filling of a container. Filling nozzle 200 generally includes pneumatic cylinder 202, liquid infeed compartment 204, and counter pressure compartment 206.

Pneumatic cylinder 202 is the top portion of filling nozzle 200 responsible for regulating the flow of carbonated liquid. Pneumatic cylinder 202 includes first air intake 208 configured to facilitate the flow of supply air to first chamber 210 and second air intake 212 configured to facilitate the flow of supply air to second chamber 214. In some implementations, first air intake 208 and first chamber 210 are configured to extend plunger 218 when air is supplied such that the flow of liquid from liquid infeed compartment 204 to counter pressure compartment 206 is prevented (e.g., a closed orientation as shown in FIG. 4B). In some implementations, second air intake 212 and second chamber 214 are configured to retract plunger 218 when air is supplied such that liquid can flow between liquid infeed compartment 204 and counter pressure compartment 206 (e.g., an open orientation as shown in FIG. 4A). In some embodiments, second air intake 212 can optionally include a manual shutoff knob 216. Actuation of manual shutoff knob 216 can prevent filling nozzle 200 from entering an open orientation.

As illustrated, pneumatic cylinder 202 is a double acting pneumatic cylinder configured to manipulate plunger 218 based on the principle of differential air pressure between first chamber 210 and second chamber 214. By supplying compressed air to first air intake 208 or second air intake 212 the cylinder can control the movement of plunger 214 downwards and upwards respectively (e.g., within filling nozzle 200). Accordingly, pneumatic cylinder 202 allows for precise control over the position and movement of plunger 218, which can be used to selectively stop the flow of carbonated liquid within liquid infeed compartment 204.

Liquid infeed compartment 204 is configured to receive and regulate the flow of carbonated liquid into a container, allowing precise control of carbonated liquid, for example once a pressure equilibrium is established within the container. Liquid infeed compartment 204 includes a liquid inlet 220 and a liquid cavity 222.

Liquid inlet 220 is the middle portion of filling nozzle 200 and the entry point where carbonated liquid enters liquid cavity 222. Carbonated liquid entering liquid cavity 222 through liquid inlet 220 can be, for example, from a storage tank, reservoir, or supply line. In some embodiments, liquid inlet 220 can include an attachment mechanism 224. Attachment mechanism 224 can be structured and configured to selectively couple (e.g., form a seal with) carbonated liquid tubing. For example, attachment mechanism 224 can include one or more protrusions and/or recesses corresponding to recesses and/or protrusions of carbonated liquid tubing.

In some embodiments, liquid infeed compartment 204 includes a filter or a sensor(s). For example, liquid infeed compartment 204 can include a filter or a strainer to remove any particulates or impurities from the liquid before prior to filling a container. For example, liquid infeed compartment 204 can include a pressure sensor and/or a level sensor (e.g., configured to determine carbonated liquid level).

Counter pressure compartment 206 is the bottom portion of filling nozzle 200 where liquid and gas flow pathways are integrated. Counter pressure compartment 206 is structured and configured to establish and maintain pressure equilibrium within a container during the filling process, minimizing the loss of carbonation and preventing excessive foaming.

Counter pressure compartment 206 generally includes a sealing mechanism to form an air-tight seal between filling nozzle 200 and a container. In some embodiments, counter pressure compartment 206 includes a container channel 228 configured to selectively receive a portion of the container (e.g., when filling nozzle 200 is lowered onto the container).

In some embodiments, container channel 228 includes a gasket 230 and is bounded by an interior wall 232 and an exterior wall 234. Container channel 228 is sized and structured based on properties of a container to be filled. For example, if a container has a wide opening, such as an aluminum can, interior wall 232 may be shortened or unnecessary (e.g., to establish an air-tight seal).

In some implementations, external wall 234 is tapered. For example, if the container has a narrow opening, such as a glass bottle, exterior wall 234 can include a tapered end 236. When filling nozzle 200 is lowered onto a container tapered end 236 can direct a lip or rim of the container inward towards channel 228. Adjustment of the container by tapered end 236 can improve accuracy of dispensing tube 226 within the container, for example, by accounting for variances in container placement between filling cycles.

Counter pressure compartment 206 includes gas inlet 238 and return port 240. Gas inlet 238 is configured to releasably couple $CO_2$ tubing and allows pressurized gas (e.g., $CO_2$) to enter a container to maintain pressure. Return port 240 is configured to releasably couple pressure relief tubing and allows for pressure management (e.g., pressure relief) and overflow handling.

In operation, filling nozzle 200 is configured to establish pressure equilibrium within a bottle during a filling cycle. Filling nozzle 200, equipped with counter pressure compartment 206 configured for a bottle, forms a seal against the neck of the bottle. Pre-pressurization is performed by injecting $CO_2$ gas into the bottle via gas inlet 238 to match a defined system pressure. Once pressure is established, pneumatic cylinder 202 actuates to transition filling nozzle 200 to an open orientation. Carbonated liquid flows through liquid infeed compartment 204 and down dispensing tube 226 to the bottom of the bottle. While filling, a pressure relief system can maintain the pressure within the container (e.g., by releasing excess gas) via return port 240. Once filled, pneumatic cylinder 202 actuates to transition filling nozzle 200 to a closed orientation. Filling nozzle 200 can retract (e.g., as part of a larger system, such as system 100) and the bottle can be sealed.

Figure 5:
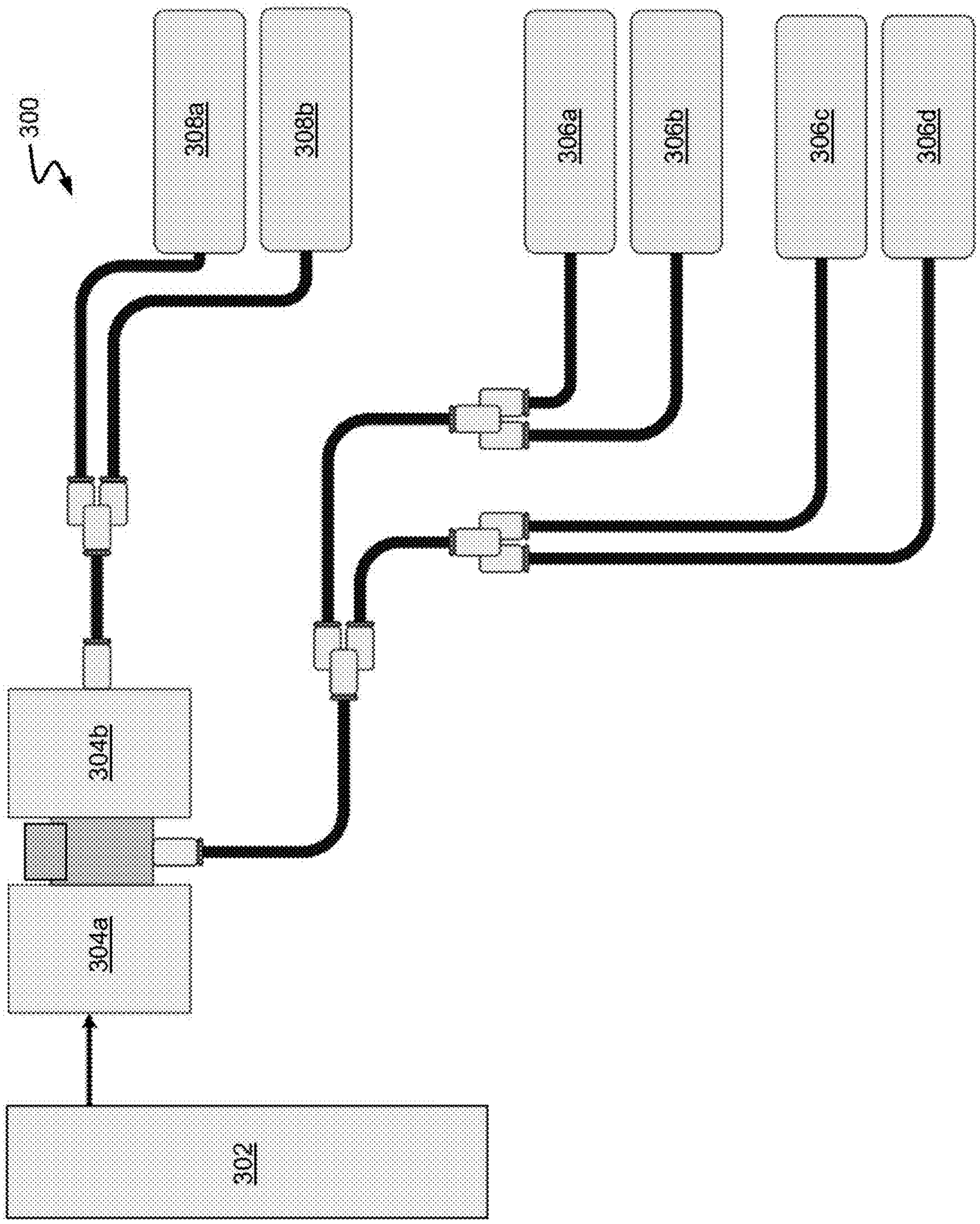
FIG. 5 depicts a system diagram of a pneumatic control system, according to certain aspects of the present disclosure.

Referring now to FIG. 5, a diagram of pneumatic control system 300 is depicted, according to an embodiment. Pneumatic control system 300 can be used in managing the handling and filling of containers (e.g., by allowing for instant responses based on monitored system data). Pneumatic control system generally includes a compressed air supply 302, regulators 304, filling nozzle valves 306, and indexer valves 308.

Compressed air supply 302 can supply compressed air to pneumatic system 300. Pneumatic pressure of supplied compressed air can be managed by regulators 304. In one case, compressed air can be supplied at a first pressure (e.g., 120 PSI). A primary regulator 304*a* can reduce supplied pressure to a second pressure (e.g., to 65 PSI), which can be distributed to filling nozzle valves 306. A secondary regulator 304*b* can further reduce supplied pressure to a third pressure (e.g., 15 PSI), which can be distributed to indexer valves 308.

In some embodiments, filling nozzle valves 306 are pneumatic cylinders configured to control the supply of carbonated liquid during a filling cycle (e.g., pneumatic cylinder 202). In some implementations, the number of filling nozzle valves is configurable based on the number of filling nozzles. For example, four filling nozzle valves 306*a*, 306*b*, 306*c*, 306*d* can be used.

In some embodiments, indexer valves 308 are incorporated into indexer(s) associated with movement and/or positioning of containers. In some implementations, the number of indexer valves 308 is configurable based on the number and arrangement of counter pressure filling stations. For example, two indexer valves 308*a*, 308*b* can be used with indexer valve 308*a* positioned at a first end of a container loading station and indexer valve 308*b* positioned at a second end of the container loading station.

Figure 6:
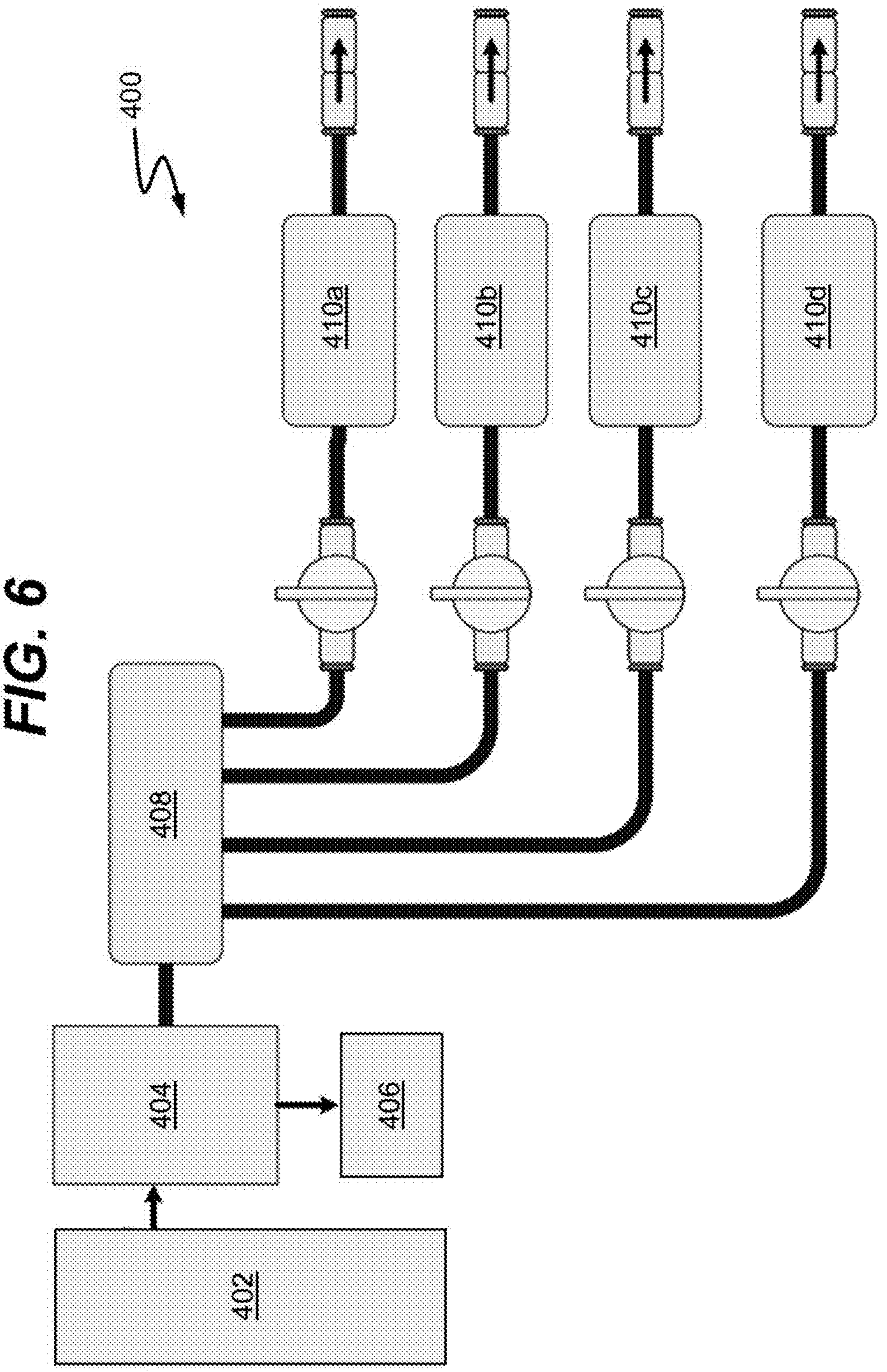
FIG. 6 depicts a system diagram of a $CO_2$ supply system, according to certain aspects of the present disclosure.

Referring now to FIG. 6, a diagram of a $CO_2$ supply system 400 is depicted, according to an embodiment. $CO_2$ supply system 400 can be used in establishing and maintaining counter pressure of containers during filling cycles. $CO_2$ supply system 400 generally includes a $CO_2$ supply 402, a $CO_2$ surge tank 404, a safety valve 406, a $CO_2$ manifold 408, and regulator(s) 410.

$CO_2$ supply 402 can provide a source of $CO_2$ for use in establishing counter pressure within a container. $CO_2$ supply 402 can provide $CO_2$ at an input pressure, for example 10 to 25 PSI. In some embodiments, $CO_2$ surge tank 404 can provide a secondary reservoir for $CO_2$ and include safety valve 406. Safety valve 406 is configured to release excess pressure from $CO_2$ supply system 400 if the pressure exceeds a set threshold (e.g., 30 PSI). If the pressure of $CO_2$ supply system 400 exceeds the threshold, the valve opens allowing the excess pressure to escape through the discharge port. For example, safety valve 406 can be a blowout valve or a pressure relief valve. For example, a blowout valve for surge tank configured to operate around 15-25 PSI can be set at 30 PSI. Safety valve 406 can prevent potential damage to equipment, container ruptures, improve safety, and control quality.

The supply of $CO_2$ can be distributed to multiple lines via $CO_2$ manifold 408. A (e.g., each) line of $CO_2$ can include a valve and regulator 410 leading to a gas inlet of a filling nozzle (e.g., gas inlet 238 of filling nozzle 200). For example, four $CO_2$ lines can be coupled to $CO_2$ manifold 408 and each line can include an independently controlled regulator 410*a*, 410*b*, 410*c*, 410*d*.

Figure 7:
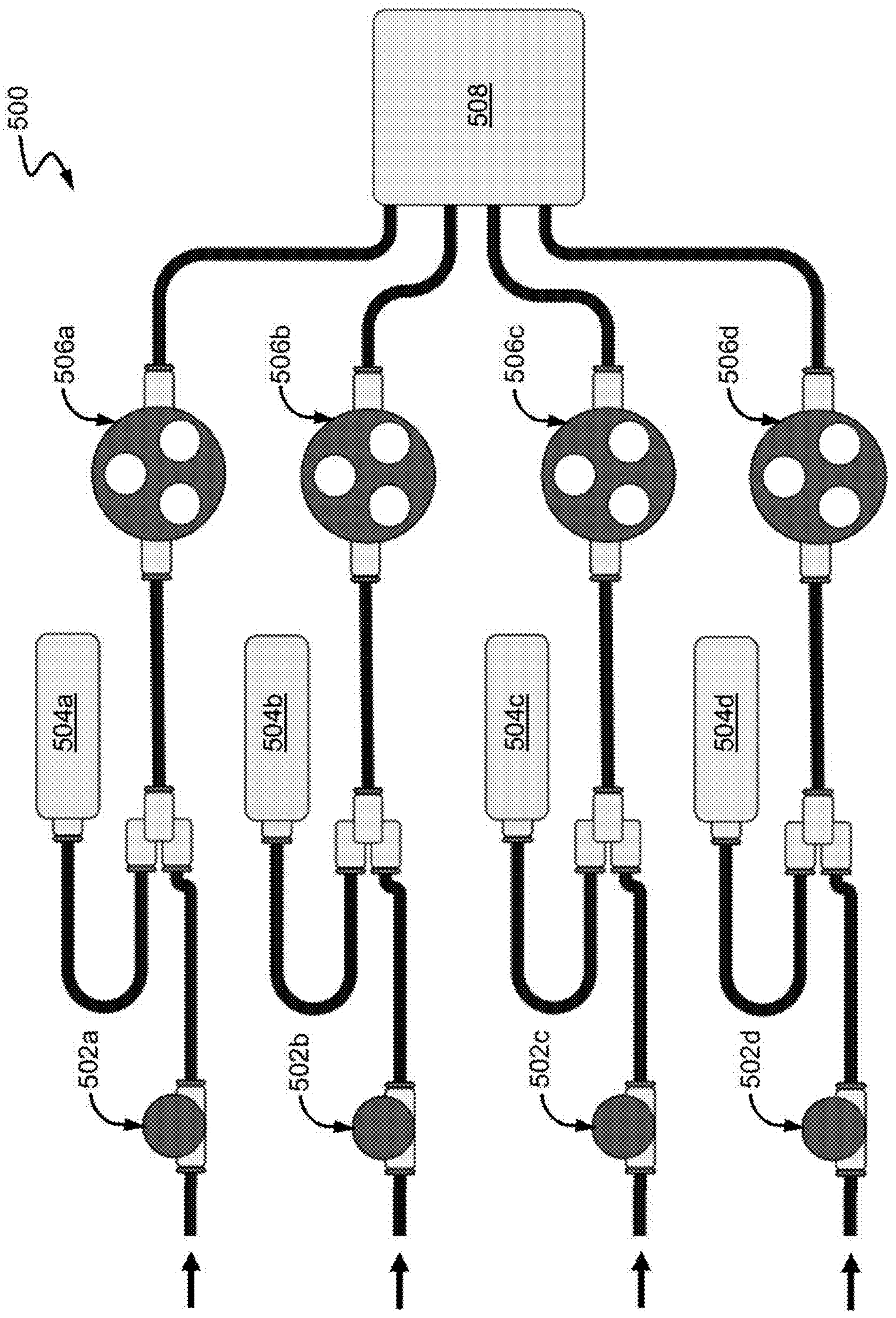
FIG. 7 depicts a system diagram of a pressure relief system, according to certain aspects of the present disclosure.

Referring now to FIG. 7, a diagram of a pressure relief system 500 is depicted, according to an embodiment. Pressure relief system 500 can be used in establishing and maintaining counter pressure of containers during filling cycles. Pressure relief system 500 generally includes fluid detection mechanisms 502, pressure sensors 504, pressure relief pumps 506, and a collection tank 508.

In some embodiments, a (e.g., each) pressure relief line (e.g., product return line) can include independent fluid detection mechanisms 502*a*, 502*b*, 502*c*, 502*d*, pressure sensors 504*a*, 504*b*, 504*c*, 504*d*, and/or pressure relief pumps 506*a*, 506*b*, 506*c*, 506*d*. In cases where nozzles are coupled to different carbonated liquids, a separate collection tank can be used (e.g., for each type of carbonated liquid). Pressure relief system 500, like $CO_2$ supply system 400 and pneumatic control system 300, can have one or more associated lines, for example, based on desired production scale.

Fluid detection mechanisms 502 are configured to send a fluid signal. A fluid signal, often referred to in the context of fluidics or fluidic logic, involves the use of fluid (e.g., liquid or gas) to transmit information or control mechanical systems. This can be particularly useful in environments where electronic signals might be hazardous or unreliable, such as counter pressure filling systems for carbonated liquids. In some implementations, signals received from fluid detection mechanisms 502 are used to determine if carbonated liquid is overflowing from a container and into the pressure relief line(s).

In some embodiments, a sensitivity of fluid detection mechanisms 502 can be configured such that foam can be distinguished from liquid.

Pressure sensors 504 are connected to the pressure relief line to measure the pressure in each container (e.g., during a fill cycle). Data from pressure relief sensors 504 can be used to inform operation of pressure relief pumps 506. Pressure relief pumps 506 can include a servo motor to dynamically and independently control the speed of the pump. For example, increasing the speed of the pump can cause the container to fill faster, which can lead to more foam. The use of pressure relief pumps 506 can mitigate sticking and obstructions that may be associated with the use of valves (e.g., needle valves) to control pressure relief.

Individualized dynamic control of counter pressure for each filling nozzle allows for optimal pressure levels tailored to the specific conditions of each container being filled and the properties of the carbonated liquid. This precision minimizes foaming and ensures consistent carbonation, leading to uniform product quality. Additionally, it enhances operational efficiency by reducing spillage and waste, and allows for faster filling speeds without compromising on quality.

Figure 8:
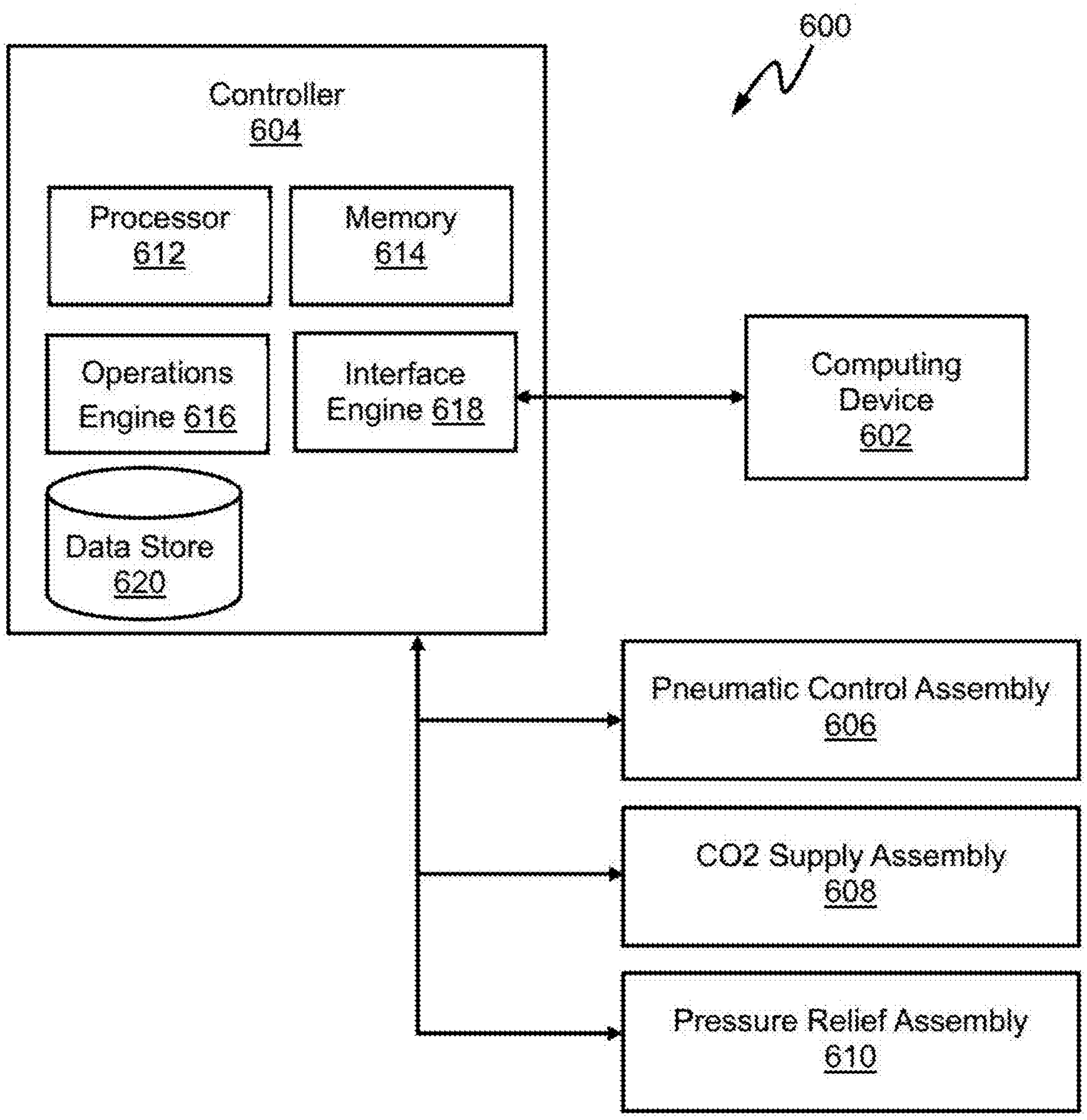
FIG. 8 depicts a block diagram of a counter pressure system for filling containers, according to certain aspects of the present disclosure.

Referring to FIG. 8, a block diagram of a counter pressure filling system 600 is depicted, according to an embodiment. Counter pressure filling system 600 is configured to establish counter pressure when filling containers with carbonated liquid. Counter pressure filling system 600 includes computing device 602, controller 604, pneumatic control assembly 606, $CO_2$ supply assembly 608, and pressure relief assembly 610. In examples, a counter pressure filling system 600 can be equipped with a series of filling nozzles independently coupled to pneumatic control assembly 606, $CO_2$ supply assembly 608, and pressure relief assembly 610 (e.g., as described with respect to FIGS. 5-7).

Computing device 602 comprises an electronic device in communication with system 600. In an example, computing device 602 can be a desktop computer, a laptop computer, tablet, mobile computing device, server, workstation, or Internet-of-things (IoT) device, among other electronic devices. Though depicted as providing a single computing device, system 600 can, in other embodiments, include a plurality of computing devices 602, such as a networked system of devices. In embodiments, computing device 602 can be utilized by a user to interact with other components of system 600, such as controller 604, to configure filling cycle parameters and/or obtain operations data.

Controller 604 generally comprises processor 612, memory 614, operations engine 616, interface engine 618, and data store 620. Controller 604 generally provides capabilities to create and execute one or more filling cycles for a counter pressure filler (e.g., system 100). In examples, controller 604 is configured to allow for adjustment of pneumatic control assembly 606, $CO_2$ supply assembly 608, and/or pressure relief assembly 610. For example, controller 604 can automatically adjust the filling rate of a container by sending instructions to a pump as part of pressure relief assembly 610.

In an embodiment, as illustrated in FIG. 8, controller 604 is implemented on a single device, such as a server, having its own processor and memory. In embodiments, controller 604 can be a cloud-based service such that control of packaging assemblies can be distributed across a network of multiple computing devices (e.g., with each device having its own processor and memory).

Embodiments described herein include various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques.

An (e.g., each) engine can be realized in a variety of physically realizable configurations and should generally not be limited to any particular implementation exemplified herein, unless such limitations are expressly identified. In addition, an engine can itself be composed of sub-engines, each of which can be regarded as an engine in its own right. Moreover, in the embodiments described herein, each of the various engines corresponds to a defined functionality; however, it should be understood that in other contemplated embodiments, each functionality can be distributed to more than one engine. Likewise, in other contemplated embodiments, multiple defined functionalities can be implemented by a single engine that performs those multiple functions, possibly alongside other functions, or distributed differently among a set of engines than specifically illustrated in the examples herein.

Operations engine 616 is (pre) configured to process operational events and notify computing device 602 of relevant events and data. For example, operations engine 616 can act as a manager that maintains the state and progress of assemblies and subassemblies throughout filling cycles. In such an embodiment, operations engine 616 can capture (e.g., track) the status, history, and/or metadata associated with each assembly (e.g., data from sensors), allowing for real-time monitoring, reporting, and analysis.

In an embodiment, operations engine 616 monitors event states and/or receives data regarding event states across packaging assemblies and systems. For example, operations engine 616 can detect or determine a data event from pressure relief assembly 610, such as a fluid signal, that can lead to one or many actions in pneumatic control assembly, such as shutoff of a carbonated liquid supply.

In an embodiment, event detection by operations engine 616 is based on a comparison of properties associated with a specified event and obtained state data. For example, a similarity search can be conducted to determine obtained sensor data is associated with a specific incident or environmental factors.

In an embodiment, operations engine 616 is configured to coordinate workflows between identified assemblies and/or systems (e.g., systems 400). For example, operations engine 616 can incorporate events, triggers, actions, and conditions, associated with operating a series of filling nozzles. Correlations, associations, and links between cross-system data can be defined by a user, for example via interface engine 618. In an example, a user can specify that a filling nozzle frame should not be retracted until signals indicating successful filling cycles are received from all filling nozzles associated with the filling nozzle frame.

Interface engine 618 provides input/output capabilities of controller 604. In an embodiment, interface engine 618 can comprise an interface, such as a graphical user interface (GUI), configured to display related event topic fields and schemas and receive user input. For example, a user can define custom operational processes based on particular containers and/or container tops though an interface provided by interface engine 618. These custom operational processes can then be saved to memory 614 or data store 620 (e.g., as an operation profile).

Interface engine 618 can include graphical or text-based interfaces for defining filling cycle workflows (e.g., assembly operating parameters). In an embodiment, interface engine 618 generates monitoring dashboards (e.g., reporting tools and analytics capabilities) to track the performance, efficiency, and compliance of packaging workflows.

In an embodiment, interface engine 618 integrates with other systems, applications, and databases to access data, trigger events, and exchange information. For example, interface engine 618 can access external databases.

Data store 620 comprises one or more storage repositories, such as a database, logical disk space, file, or other suitable storage medium configured to store operations data. In an embodiment of a database, data store 620 can be a general-purpose database management storage system (DBMS) or relational DBMS as implemented by, for example, ORACLE, IBM DB2, Microsoft SQL Server, PostgreSQL, MySQL, SQLite, LINUX, or UNIX solutions.

In an embodiment, data store 620 can be external to controller 604. For example, data store 620 can be communicatively coupled to controller 604 over a network.

In an embodiment, controller 604 can access data store 620. In embodiments, computing device 602 is provided access to all or a subset of operations data in data store 620 (e.g., operations data applicable to a particular packaging assembly or system can be provided).

In an embodiment, a user can provide operations data to data store 620 using computing device 602. In another embodiment, operations engine 616 itself can actively gather or request event data from computing device 602, pneumatic control assembly 606, $CO_2$ supply assembly 608, or pressure relief assembly 610.

Pneumatic control assembly 606 is configured to mediate actuators of system 600 during filling cycles. Pneumatic control assembly 606 can include, for example, a valve manifold to distribute a compressed air supply.

$CO_2$ supply assembly 608 is configured to provide $CO_2$ to a container. $CO_2$ supply assembly 608 can be equipped with regulators for each filling nozzle.

Pressure relief assembly 610 is configured to establish counter pressure within a container, determining fill rate, and handle product overflow.

Pneumatic control assembly 606, $CO_2$ supply assembly 608, and Pressure relief assembly 610 can optionally include sensor(s), such as pressure sensors or flow sensors. In an embodiment, controller 604 can coordinate the operation of individual motors and monitor feedback data, for example from sensors.

Some filling systems can be controlled on a per station basis, where a station refers to one or more nozzles that are commonly controlled, for example by being associated with (e.g., sharing) a common motor and/or a pressure supply line. Such filling system orientations can require the filling system to incorporate product and gas lines that are common to all nozzles in the station (e.g., rather than individual filling nozzles). These filing systems can encounter inconsistent pressure across containers and/or be unable to precisely maintain counter pressure. This lack of precision in operation and monitoring capabilities can lead to varied loss of $CO_2$ and increased risk of excessive foaming. For example, different carbonated liquids can produce foam at different filling speeds. Further, station-based filling systems may be unable to communicate high granularity data, such as detailed metrics on a container specific basis, to a control system.

Figure 9:
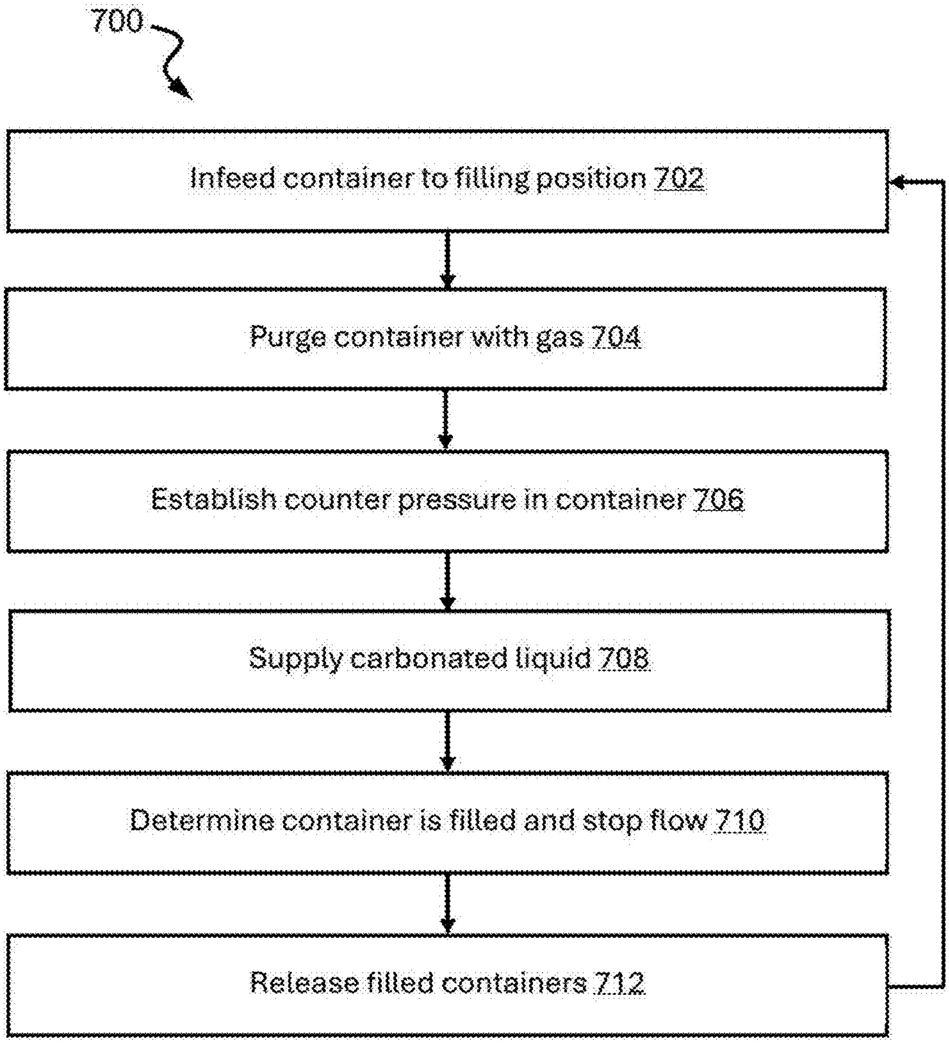
FIG. 9 depicts a flow chart of an example method of filling containers with carbonated liquid, according to certain aspects of the present disclosure.

Referring to FIG. 9, a flowchart of a method for operating a counter pressure filling station is depicted, according to an embodiment.

At 702, method 700 comprises aligning empty containers into filling positions.

In some embodiments, indexers (e.g., pneumatic indexers) can be used to control infeed of empty containers.

In some embodiments, sensors, such as photoelectric sensors, are used to detect containers are in the proper position. In some implementations, a dual-sensor arrangement can be incorporated with a first sensor located at the first filling position and a second sensor located at the last filling position. For example, in cases where containers are conveyed in an adjacent manner it can be determined that all filling positions are occupied if the first and last filling positions are occupied.

In some embodiments, a controller can determine whether (pre) defined settings (e.g., operating conditions) associated with the container and filling cycle are met. If settings are not properly adjusted, an alert or notification can be provided (e.g., via a GUI).

At 704, method 700 comprises lowering filling nozzles about the top opening of the container (e.g., without sealing the container) and purging the container with $CO_2$ gas. $CO_2$ gas is used to displace the air in the container, causing excess air and $CO_2$ gas to be pushed out of the container (e.g., through a space between the top of the container and the filling nozzle). For example, empty bottles or cans are first purged with $CO_2$ to remove any oxygen, which may cause oxidation and spoilage.

At 706, method 700 comprises, while $CO_2$ is still flowing, lowering filling nozzles to contact the top of the container, forming an air/liquid tight seal. The continued supply of $CO_2$ allows the system to achieve counter pressure in the container. Pressurization of the containers with $CO_2$ to a pressure similar to that of the carbonated liquid counteracts the pressure of the liquid and prevents foaming when the liquid is introduced. In some embodiments, the counter pressure can be preset.

At 708, method 700 comprises supplying carbonated liquid to the container by opening filling nozzles. The carbonated liquid may not flow if the counter pressure is the same or above the infeed liquid pressure. If the counter pressure in the container is higher than the infeed pressure the liquid will be forced back into the infeed holding vessel.

In some embodiments, the controller can monitor the liquid pressure and counter pressure to ensure smooth flow. For example, a pressure relief pump can be articulated to adjust the infeed for slow or fast startup of the filling cycle. In some implementations, the flow can be accelerated following the initial portion of the filling cycle and/or decelerated at an end portion of the filling cycle.

At 710, method 700 comprises determining the container is filled and suspending carbonated liquid flow. The fill volume of the liquid is achieved when all the air in the container is evacuated by the pressure relief pump.

In some embodiments, a liquid overflow sensor (e.g., associated with a particular filling nozzle) is activated based on detection of a return flow of liquid from the container. A threshold sensitivity can be defined for the liquid overflow sensor such that the presence of foam does not trigger a filled signal. For example, foamy beverages, such as beer, can be set to higher thresholds, allowing the system to distinguish between foam and solid product.

Once a filled signal is sent to the controller the carbonated liquid supply via the filling nozzle is closed and the $CO_2$ gas is closed (e.g., resulting in the pressure of the container becoming the infeed pressure).

At 712, method 700 comprises retracting the filling nozzles out of the containers based on the pressure inside the container being 0 PSI. In some cases, the pressure relief pump can be activated to speed up the reduction in pressure.

The full containers are then released, and empty containers can be brought in to being another fill cycle (e.g., returning to 702).

Embodiments of the present disclosure accordingly allow containers to be filled with carbonated liquid while under the same pressure, ensuring minimal loss of $CO_2$ and reducing the risk of foaming.

Various examples of systems, devices, and methods have been described herein. Although features and elements described above are described in particular combinations, each feature or element can be used alone without the other features and elements of the examples or in various combinations with or without other features and elements. For example, while various materials, dimensions, shapes, configurations and locations, etc. have been described for use with disclosed examples, others besides those disclosed can be utilized without exceeding the scope of the claimed inventions.

Persons of ordinary skill in the relevant arts will recognize that the subject matter hereof can comprise fewer features than illustrated in any individual example described above. The examples described herein are not meant to be an exhaustive presentation of the ways in which the various features of the subject matter hereof can be combined. Accordingly, the examples are not mutually exclusive combinations of features; rather, the various examples can comprise a combination of different individual features selected from different individual examples, as understood by persons of ordinary skill in the art. Moreover, elements described with respect to one example can be implemented in other embodiments even when not described in such embodiments unless otherwise noted.

For purposes of interpreting the claims, it is expressly intended that the provisions of 35 U.S.C. § 112(f) are not to be invoked unless the specific terms "means for" or "step for" are recited in a claim.

The invention claimed is:

1. A counter pressure filling system comprising:

a counter pressure assembly fluidly coupled to a pressure relief assembly, the counter pressure assembly configured to receive and establish a seal with an opening of a first container, the pressure relief assembly having a first pump configured to control a first counter pressure of the first container in real-time, the counter pressure assembly having a nozzle assembly including a nozzle bar supporting a first nozzle comprising:

a carbonated liquid infeed port fluidly coupled to a carbonated liquid tank via a carbonated liquid line, the carbonated liquid tank having a carbonated liquid, a gas infeed port fluidly coupled to a gas tank via a gas supply line, and a pressure relief port fluidly coupled to a reservoir via a pressure relief line via the pressure relief assembly, wherein the first pump being fluidly coupled to the pressure relief port and configured to adjust pump speed in real-time; and a controller communicatively coupled to the nozzle assembly and the first pump, the controller comprising a memory and at least one processor configured to:
determine the first container is in a filling position associated with the first nozzle;
set the nozzle bar to a blowout height, wherein the blowout height is a height at which the first nozzle is adjacent to an opening of the first container;
purge, via the first nozzle fluidly coupled to the gas tank, the first container with a supply of gas;
set the nozzle bar to a dive height, wherein the dive height is a height at which the first nozzle forms a seal with the opening of the first container;
establish, via the first nozzle fluidly coupled to the first pump, the first counter pressure inside the first container by maintaining the supply of gas; and
fill, via the first nozzle fluidly coupled to the carbonated liquid tank, the first container with a first supply of the carbonated liquid at a filling rate based on the counter pressure;
wherein the first pump can adjust pump speed in real-time to establish the first counter pressure and filling rate of the carbonated liquid into the first container.

2. The system of claim 1, wherein the counter pressure assembly configured to receive and establish a seal with an opening of a second container, the pressure relief assembly having a second pump configured to control the counter pressure of the second container in real-time, and the nozzle bar supports a second nozzle fluidly coupled to the carbonated liquid tank via a second carbonated liquid line, the gas tank via a second gas supply line, and the reservoir via second pressure relief line, and wherein the controller is configured to command the second nozzle and the second pump independently from the first nozzle and the first pump, such that the controller is configured to:
determine the second container is in a filling position associated with the second nozzle;
set the nozzle bar to a blowout height, wherein the blowout height is a height at which the second nozzle is adjacent to an opening of the second container;
purge, via the second nozzle fluidly coupled to the gas tank, the second container with a supply of gas;
set the nozzle bar to a dive height, wherein the dive height is a height at which the second nozzle forms a seal with the opening of the second container;
establish, via the second nozzle fluidly coupled to the second pump, counter pressure inside the second container by maintaining the supply of gas; and
fill, via the second nozzle fluidly coupled to the carbonated liquid tank, the second container with a supply of the carbonated liquid at a filling rate based on the counter pressure;
wherein the second pump can adjust pump speed in real-time to adjust the second counter pressure and the filling rate of the carbonated liquid into the second container.

3. The system of claim 1, further comprising a conveying assembly including an indexer configured to align the first container to the filling position associated with the first nozzle, wherein the conveying assembly communicatively coupled to the controller.

4. The system of claim 3, further comprising a control system coupled to the nozzle assembly and the conveying assembly, the control system comprising a pneumatical control or a servo motor, wherein the controller is configured to control a height of the nozzle bar and the indexer using the control system.

5. The system of claim 1, wherein the controller is further configured to:
determine the first container is filled with the carbonated liquid;
shutoff, via the first nozzle and based on the determination the container is filled, the supply of the carbonated liquid and the supply of the gas; and
set the nozzle bar to the blowout height to break the seal with the opening of the first container.

6. The system of claim 5, wherein the determination that the first container is filled with the carbonated liquid is based on a signal received from a liquid overflow sensor.

7. The system of claim 6, wherein the liquid overflow sensor is configured to send the signal based on a configurable sensitivity threshold.

8. The system of claim 7, wherein the configurable sensitivity threshold is selected based on a property of the carbonated liquid.

9. The system of claim 1, wherein the determination that the container is in the filling position is based on a photoelectric sensor.

10. The system of claim 1, wherein the controller is further configured to display a graphical user interface (GUI) configured to receive user input including the blowout height and the dive height.

11. A counter pressure filling method comprising:
positioning a filling nozzle adjacent to an opening of a container;
purging, via the filling nozzle fluidly coupled to a gas tank, the container with a gas from the gas tank;
positioning the filling nozzle against the opening of the container to form a seal;
establishing, via the filling nozzle fluidly coupled to a pump, counter pressure inside the container by maintaining supply of the gas to the container; and
filling, via the filling nozzle fluidly coupled to a carbonated liquid tank, the container with a carbonated liquid from the carbonated liquid tank at a filling rate based on the counter pressure;
wherein pump speed can be adjusted in real-time to adjust the counter pressure and the filling rate of the carbonated liquid into the container.

12. The method of claim 11, further comprising:
determining the container is filled with the carbonated liquid;
shut off, via the filling nozzle and based on the determination the container is filled, the supply of the carbonated liquid and the supply of the gas; and
positioning the filling nozzle about the opening of the container such that the seal is broken.

13. The method of claim 12, wherein determining the container is filled with the carbonated liquid comprises receiving a signal from a liquid overflow sensor.

14. The method of claim 13, wherein the liquid overflow sensor is configured to send the signal based on a configurable sensitivity threshold.

15. The method of claim 14, wherein the configurable sensitivity threshold is selected based on a property of the carbonated liquid.

16. The method of claim 11, wherein the counter pressure inside the container is less than an infeed liquid pressure of the carbonated liquid.

17. A counter pressure filling system comprising:
a nozzle assembly including a nozzle bar supporting a first nozzle fluidly coupled to:
a carbonated liquid tank via a carbonated liquid line,
a gas tank via a gas supply line, and a reservoir via a pressure relief line; and a controller communicatively coupled to the nozzle assembly, the controller comprising a memory and at least one processor configured to:

determine a container is in a filling position associated with the first nozzle;

set the nozzle bar to a blowout height, wherein the blowout height is a height at which the first nozzle is adjacent to an opening of a container;

purge, via the first nozzle, the container with a supply of gas;

set the nozzle bar to a dive height, wherein the dive height is a height at which the first nozzle forms a seal with the opening of the container;

establish, via the first nozzle, counter pressure inside the container by maintaining the supply of gas;

fill, via the first nozzle, the container with a supply of a carbonated liquid at a filling rate based on the counter pressure;

determine the container is filled with the carbonated liquid based on a signal received from a liquid overflow sensor configured to send the signal based on a configurable sensitivity threshold;

shutoff, via the filling nozzle and based on the determination the container is filled, the supply of the carbonated liquid and the supply of the gas; and set the nozzle bar to the blowout height to break the seal with the opening of the container.

18. The system of claim 17, further comprising a pressure relief assembly fluidly coupled to the nozzle assembly, the pressure relief assembly having a pump configured to control counter pressure of the container in real-time via a pressure relief port of the first nozzle, wherein the controller can adjust pump speed in real-time to establish the counter pressure and filling rate of the carbonated liquid into the container.

19. The system of claim 18, wherein the nozzle assembly includes two or more nozzles supported on the nozzle bar, wherein the pressure relief assembly having two or more pumps, each pump operably coupled with each of the two or more nozzles and corresponding container to control counter pressure and filling rate of the carbonated liquid into the respective container.

20. The system of claim 17, further comprising:

a conveying assembly including an indexer configured to align each container to the filling position associated with the respective nozzle, wherein the conveying assembly communicatively coupled to the controller; and a control system coupled to the nozzle assembly and the conveying assembly, the control system comprising a servo motor, wherein the controller is configured to control a height of the nozzle bar and the indexer using the control system.

* * * * *